United States Patent
Hammond et al.

(10) Patent No.: US 6,237,722 B1
(45) Date of Patent: May 29, 2001

(54) RAILROAD HANDBRAKE "OFF" SENSOR

(75) Inventors: Brady J. Hammond; Kevin J. Engler; Brad L. Cummins, all of Freeport, IL (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 09/208,941

(22) Filed: Dec. 10, 1998

(51) Int. Cl.$^7$ .................................................. F16D 66/00
(52) U.S. Cl. .................. 188/1.11 R; 188/107; 116/58 A; 303/7
(58) Field of Search ............................... 188/1.11 R, 107; 74/505, 506; 116/58 A, 58 R; 303/7, 15, 16, 17, 20

(56) References Cited

U.S. PATENT DOCUMENTS

| | | | |
|---|---|---|---|
| Re. 33,207 | * 5/1990 | Brodeur et al. | 188/1.11 R |
| 1,491,753 | * 4/1924 | Sauvage | 188/107 |
| 3,294,035 | * 12/1966 | Enochian | 188/107 |
| 3,854,417 | * 12/1974 | MacDonnell et al. | 188/1.11 R X |
| 4,296,707 | * 10/1981 | Kennedy | 116/58 A |
| 4,552,412 | 11/1985 | Balukin et al. | |
| 4,555,120 | 11/1985 | Frait et al. | |
| 4,904,027 | 2/1990 | Skantar et al. | |
| 5,038,605 | * 8/1991 | Tews et al. | 73/129 |
| 5,201,834 | * 4/1993 | Grazioli et al. | 246/169 R |
| 5,286,096 | 2/1994 | Ferri et al. | |
| 5,415,379 | 5/1995 | Hoyt et al. | |
| 5,469,941 | * 11/1995 | Horvath | 188/107 |
| 5,528,948 | 6/1996 | De Gelis | |
| 5,586,812 | * 12/1996 | Kanjo et al. | 303/7 |
| 5,632,367 | 5/1997 | Bergeron et al. | |

* cited by examiner

Primary Examiner—Robert J. Oberleitner
Assistant Examiner—Pamela J. Rodriguez
(74) Attorney, Agent, or Firm—Roland W. Norris; Allan W. Watts

(57) ABSTRACT

A railroad brake sensing apparatus particularly suitable for handbrake sensing has a sheave wheel/bellcrank bracket which is slotted to allow the wheel/crank axle to move from a first position when the chain is under tension and the brake is applied; to a second position when the chain is slack and the brake is off. A sensor is placed to detect when the wheel/crank is in the second position. The brake sensing apparatus is easily adapted to be used with other forms of brake actuating force and placed with other moving members of the brake rigging.

19 Claims, 3 Drawing Sheets

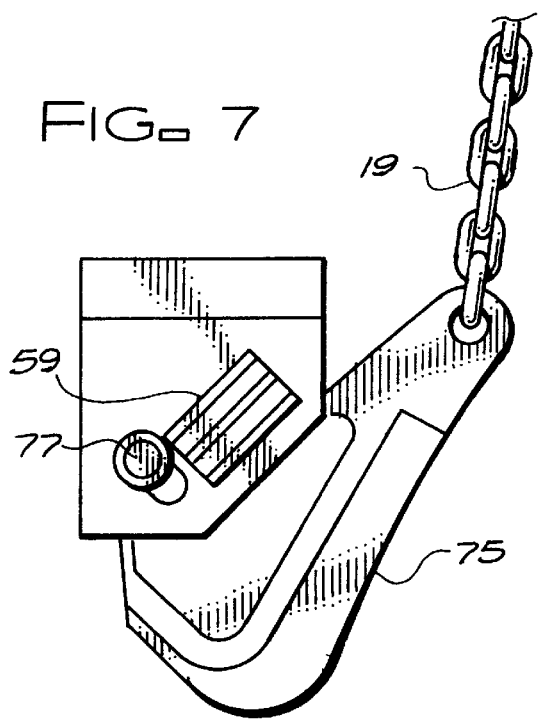
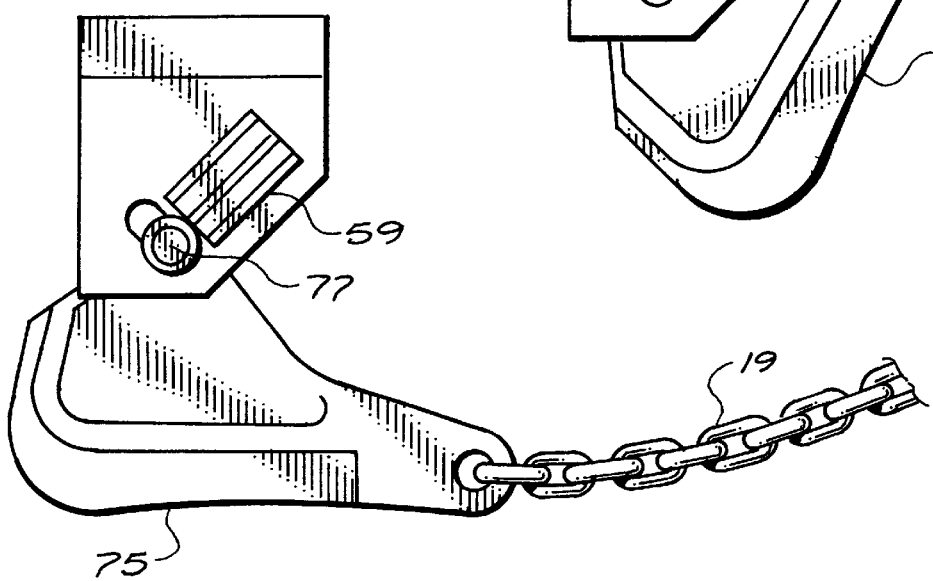
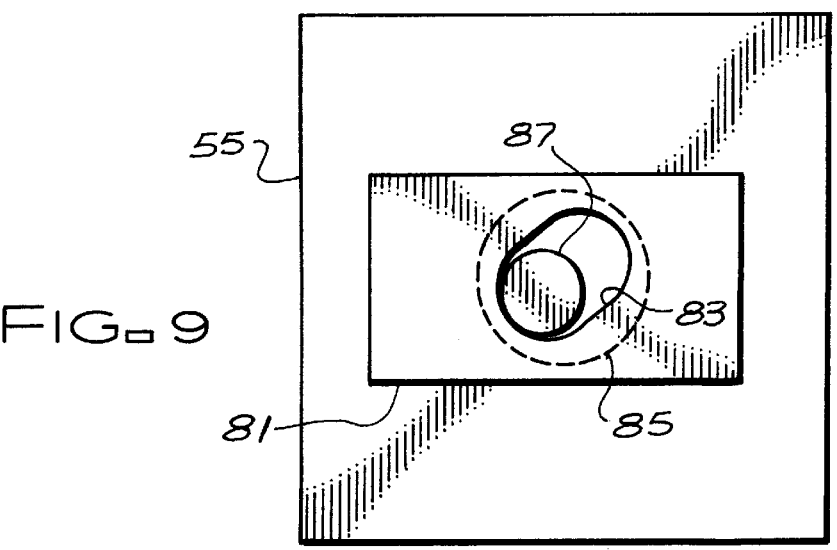

RAILROAD HANDBRAKE "OFF" SENSOR

BACKGROUND OF THE INVENTION

1. Field of the Invention

This invention relates to sensors capable of distinguishing when the manual hand brake setting apparatus of a railroad car is in the "Off" or "Brake Release" position.

2. Description of the Related Art

The rail industry has a very high maintenance cost related to wheel damage. The majority of this damage is the result of handbrakes being left on prior to a train departing the rail yard. If a car has the handbrake left on when the train begins to move, the wheels of that car will not turn, resulting in a worn, flat spot on the wheel. The handbrake being left on can also result in a derailment if not detected prior to the train leaving the rail yard. For these reasons it is desirable to provide the manual handbrake setting apparatus of a railcar with a sensor having an indication means whereby the railroad operator is able to determine that the manual setting of the brakes is placed in the "off" position before moving the train.

It is well known in the art of railroad car building to equip railcars with a manual brake system which is actuated by a manually turned wheel generally located on the front, or back, of said car. In one common application the wheel is attached through gearing to an axle which is attached to a chain running down the front of the car and generally to the undercarriage of said car where the chain is linked to the brake rigging. Turning of the wheel gathers the chain, putting it in tension, whereby the brakes, i.e. brake pads, are pulled into the wheel assembly. Release of the chain to sufficient slack where it will not tighten and engage the brakes under any conditions, such as the rail car tilting when going around curves, etc., is accomplished by turning the wheel in the opposite direction, or pulling a release arm, to unwind chain from the main axle.

Because the railroad car will often be subject to extremes of environment including temperature, dirt, water, and the like it is further very desirable that the sensor have a rugged construction unlikely to be susceptible to environmental degradation. It is further desirable that the sensor be located on the railroad car where it is least likely to be susceptible to such environmental degradation or contamination.

SUMMARY OF THE INVENTION

A railroad brake sensor according to the present invention operates on a railroad brake system at points where the brake actuating force is translated or transfered creating an opportunity to sense the brake position through the orientation or position of the force translating/transfer members of the brake rigging or apparatus. For example a handbrake system which uses a sheave wheel or bellcrank to guide a handbrake chain from its vertical position, at the front of the car, to a horizontal position running under the car where it connects with the brake rigging, provides many such opportunities.

For example, the sheave wheel can be mounted in a bracket by its axle. The mounting of the bracket is slotted to allow the wheel and its axle to move from a first or upper position when the chain is under tension and the brake is applied; to a second, lower position when the chain is slack and the brake is off. A sensor is placed to detect when the axle is in the second position. The sensor may be placed near the lower position to detect the axle or may be placed on the axle in order to detect a target feature located near the second position. The type of sensor is preferably a magnetically sensitive sensor such as a Hall effect or magnetoresistive sensor. It could also be a suitably selected proximity sensor, mechanical switch, force sensor or other suitable sensing means.

BRIEF DESCRIPTION OF THE DRAWINGS

The present invention will be more fully and completely understood from a reading of the Description of the Preferred Embodiment in conjunction with the drawings, in which:

FIG. 7 is an alternative embodiment of the present invention utilizing a bellcrank instead of a sheave wheel and showing the bell crank with chain tension applied.

FIG. 8 shows the bell crank in the slack chain position.

FIG. 9 shows an alternative guide plate taking the place of the bracket slot.

DESCRIPTION OF THE PREFERRED EMBODIMENT

Figure 1:
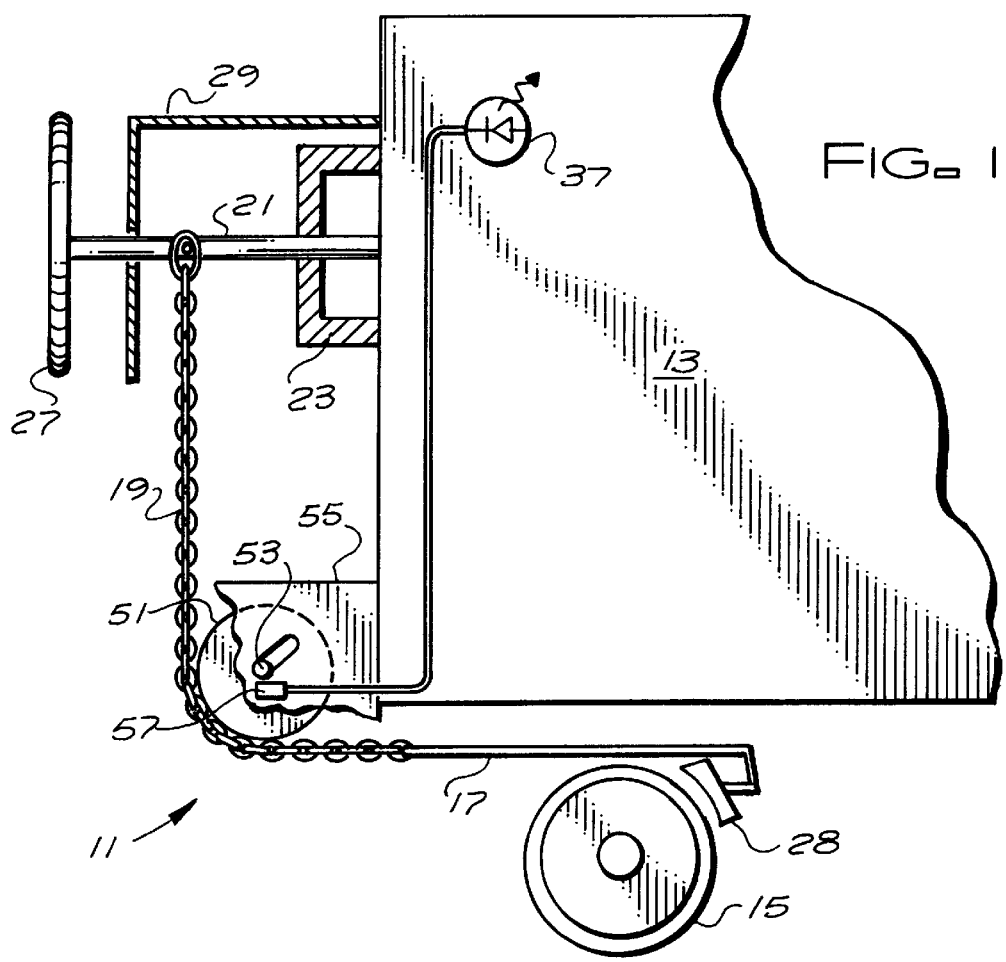
FIG. 1 is a schematic of a railroad car with the handbrake sense of the present invention installed thereon.

Throughout the Description of the Preferred Embodiment, like components will be identified by like reference numerals.

As seen in FIG. 1, a railcar 11 (front end) has a body 13 mounted on a carriage assembly, or trucks (not shown) which carry the wheels 15 and the brake linkage 17. A manual system for engaging the brake linkage 17, simplified to its main components, includes a chain 19 which is attached to a main shaft 21 which is rotatably affixed to the car body 13 by a bearing 23 near the car body 13. At the outboard end of the main shaft 21 is located a hand wheel 27 for manual rotation of the main shaft 21 in order to put the chain 19 in tension or slack. When hand wheel 27 is turned to gather chain 19 about the main shaft 21, chain 19 is put in tension thereby engaging the brake linkage 17 to set the brake pads 28 against the wheels 15. Normally a cover 29 is provided for the journaled end of the main shaft 21 and the gathered chain 19 to provide some environmental protection therefor.

According to the present invention, as shown highly schematically in FIG. 1, a means for translating the orientation or motion of chain 19 from vertical to horizontal such as a sheave wheel 51, bellcrank, or the like, is attached to the car 13 by a bracket 55. A sensing element 57 is located near the axle 53 of the sheave wheel, which acts as a target for the sensing element 57. When the target is placed within the sensitivity range of the sensing element 57 the position of the brake chain 19 is therefore determined. Normally the most critical piece of information for the railroad operator is that the brakes are off when the train is placed under motive force. Therefore it is this condition which is most preferably sensed. The sensor 57 is then connected to suitable output electronics and operator interface indication means schematically illustrated by LED 37 although many forms of operator interface will be apparent to the ordinarily skilled artisan in the sensing arts.

Some common parts of the brake mechanism and railroad car assembly have been left out for purposes of clarity of explanation but will be recognized by the ordinary artisan of railroad construction and are not deemed necessary to a further exposition of the present invention.

Figure 2:
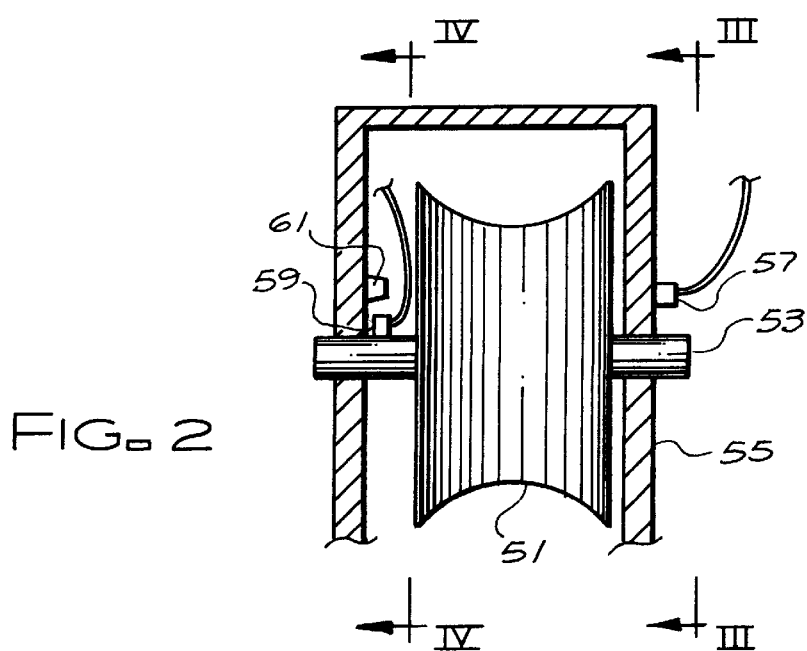
FIG. 2 is a top view of an embodiment of the present invention utilizing a sheave wheel.

Referencing FIG. 2, a top view of a sheave wheel and sensor assembly according to the present invention, a sheave wheel 51 with an axle 53 is contained within a mounting bracket 55. Sheave wheel 51 is one embodiment of a means for directing a brake actuation force from a first orientation to a second orientation. A magnetically sensitive sensor 57 is placed on the outside of the bracket near axle 53, as further explained below. A magnetically sensitive sensor such as a Hall effect element or magneto-resistive sensor is preferred due to its ruggedness and resistance to environmental degradation. However, it will be apparent to the ordinarily skilled artisan upon further exposition of the invention that any of a variety of suitably rugged sensors may be utilized including proximity sensors, forces sensors, or mechanically actuated switches for example. It will further be understood that the sensing element 57 may be placed either on the inside or the outside of the bracket 55 in order to accomplish its intended purpose.

Also as seen in FIG. 2, a sensing element 59 may likewise be located upon the axle to travel therewith in order to detect a feature 61 placed within the range of the travel of axle 53. Should the sensing element 59 be magnetically sensitive, the feature may be either a magnet or a ferromagnetic structure. In the case of a non magnetically sensitive sensing element, the feature may merely be a mechanical stop affixed to the bracket 55.

Figure 3:
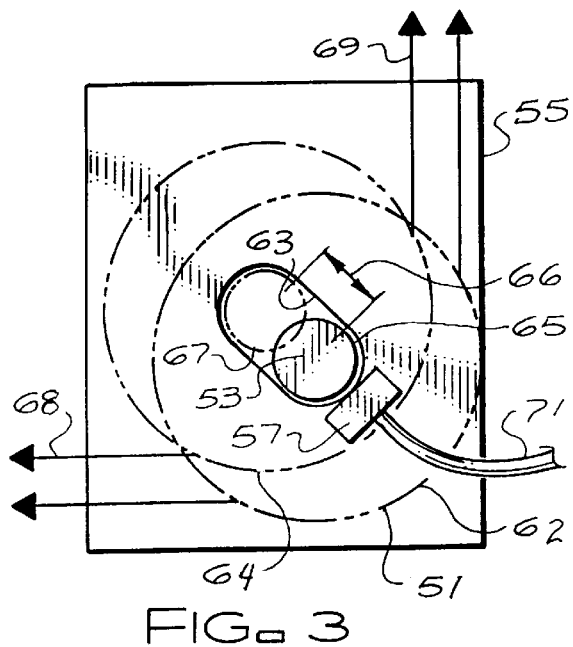
FIG. 3 is a side view of the sheave wheel and sensor mechanism along lines III—III of FIG. 2.

Referencing FIG. 3, the bracket 55 is shown as having a slot 63 for containing the axle 53 of the sheave wheel 51 (in phantom). A slot 63 is cut at an approximately 45° angle at such a length as to allow the axle 53 to move therein from an at rest position, or brake-off position 65 when the handbrake chain is not applied, to an upward or brake-on position 67 when tension is applied to the handbrake chain (not shown) to set the brakes thereby lifting sheave wheel 51 within the slot 63 and moving the axle 53, as shown in phantom at brake-on position 67, to a point (brake-off position 65) where the axle 53 can not be sensed by the sensing element 57. Thus, slot 63 is one embodiment of a means for allowing the above described means for directing to travel from a first position when the brake is on, to a second position when the brake is off. In addition, sensing element 57 is one embodiment of a means for detecting when the means for directing is in one of the first or second positions. The chain force when chain 19 is under tension to apply the handbrakes is indicated by force lines 68 and 69. Chain force 68 is the tension in chain 19 between sheave wheel 51 and the brake rigging, e.g. brake linkage 17. Similarly, Chain force 69 is the tension in chain 19 between sheave wheel 51 and the handbrake, e.g. hand wheel 27 and main shaft 21. When axle 53 is in the brake off position 65, sheave wheel 51 is in position 62, typically with no load on chain 19. On the other hand, when axle 53 is in the brake-on position 67, sheave wheel 51 is in position 64, typically with force 68 and 69 in chain 19. Care should be taken that the desired slack in chain 19 amount of travel 66 allows axle 53 to be sensed by sensing element 57 only when there is enough slack in the chain to prevent unintended application of the brakes such as during railroad car (railcar 11) travel around a curve where the car and its trucks are pivoting in opposite directions. The sensing element 57 is equipped with suitable electrical or other communication cabling 71 in order to communicate the data of the sensing element 57 to an operator interface or the like which utilizes the sensor data.

Although not shown, a spring or springs may be placed on the axle of the sheave wheel in order to bias it toward the slack or "brake off" position 65 in order to prevent environmental contamination from preventing the sheave wheel axle 53 from moving to the brake-off position 65 in order to be sensed.

Figure 4:
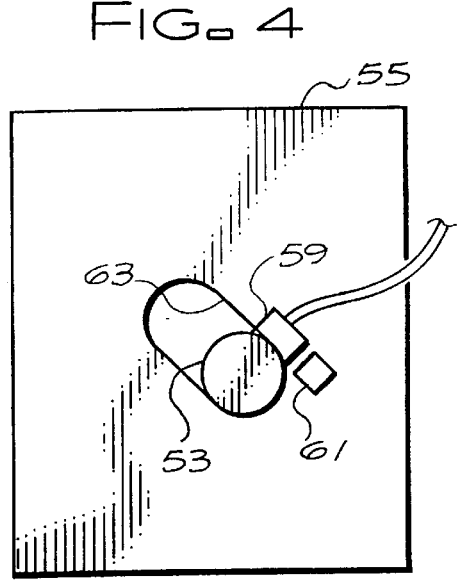
FIG. 4 is an alternative embodiment of the present invention shown generally along lines IV—IV of FIG. 2.

As seen in FIG. 4, the sensing element 59 may be placed inside the bracket 55 and mounted to the sheave wheel axle 53. When the sheave wheel (not shown) is at the brake-off position 65 resting at the lower end of slot 63, the sensing element 59 is placed in close proximity to a target feature 61. The axle 53 should have a fixed end which does not rotate for this embodiment. Where the sensing element 59 is a magnetically sensitive sensor, such as a Hall element or the like, the target 61 may be a simple steel plate or the like welded to the bracket 55. Alternatively it may be a magnet mounted such as by expoxying to the side of the bracket 55.

Figure 5:
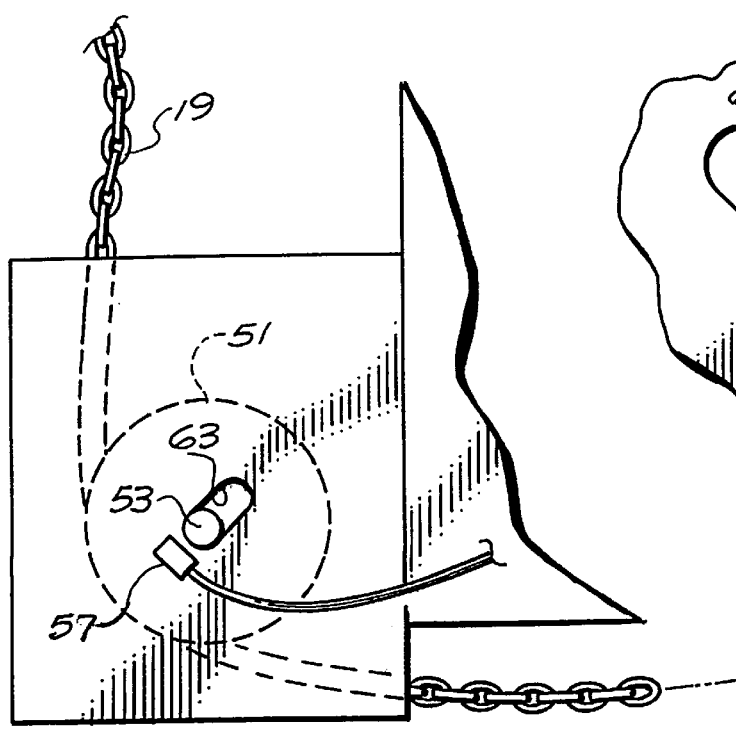
FIG. 5 is a detailed view of the present invention in situ.

As seen in FIG. 5, the chain 19 is shown in its slack position (brake-off position 65) wherein it places no force on the sheave wheel 51 (in phantom) thereby allowing the axle 53 to rest at the lower portion of the slot 63 in proximity to the sensing element 59.

Figure 6:
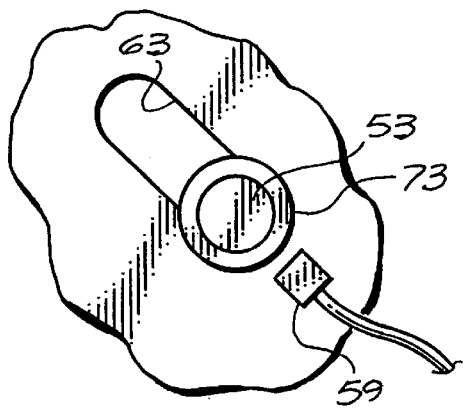
FIG. 6 shows a variant of FIG. 5 wherein the axle is not directly sensed.

As shown in FIG. 6, an arrangement similar to FIG. 5, the slot 63 contains the sheave wheel axle 53. Helping to retain the axle 53, and serving as an alternative target for sensing element 59, is a collar ring 73 to illustrate the principle that the axle need not be directly sensed, but rather may have features applied thereto.

In FIG. 7, a bellcrank 75 is shown with chain 19 in tension, placing the bellcrank 75 in the brake-on position. Bell crank 75 is an alternate embodiment of a means for directing a brake actuation force from a first orientation to a second orientation. When the chain is placed in slack, as in FIG. 8, the axle 77 of the bellcrank 75 moves to a lower position, wherein it is placed in a position to be sensed by the sensing element 59 thereby indicating that the manual handbrakes are not applied to the railroad car. The bellcrank is a well known alternative to the sheave wheel of FIGS. 2–6. Since it is a moving apparatus in and of itself, it is conceivable that no special slot needs to be cut in the mounting bracket for its axle. Instead it could be directly sensed. Such an arrangement is an embodiment of a means for allowing the above described means for directing to travel from a first position when the brake is on, to a second position when the brake is off. In addition, sensing element 59 is an embodiment of a means for detecting when the means for directing is in one of the first or second positions. Such a bellcrank embodiment may call for a mechanical stop to be placed to limit the travel of the bellcrank towards the sensing element should construction and arrangement of the parts so require.

In FIG. 9, an alternative embodiment is shown wherein a guide plate 81 with a slot 83 therein is fitted over the axle hole 85 of the mounting bracket 55, and a smaller axle 87 is substituted therefore, thereby allowing axle 87 to move to and away from the sensor. With this alternative, the existing brackets 55 need merely be fitted with guide plates 81, rather than being replaced or remachined with slots (e.g. slot 63 shown on FIG. 3). Thus, slot 83 is another embodiment of a means for allowing the above described means for directing to travel from a first position when the brake is on, to a second position when the brake is off. It will be appreciated that either embodiment may be suitably utilized in various types of brake mechanisms and in various locations thereon, according to the teachings of the present invention.

While the present invention has been shown and described with reference to preferred embodiments, many alternatives will become apparent to the ordinarily skilled artisan upon disclosure of the present invention. Therefore the present invention is only to be limited by the claims appended hereto.

Having thus described the invention what is claimed is:

1. A railroad brake sensing apparatus for a railcar having at least one brake comprising:
    a) a means for directing a brake actuation force from a first orientation to a second orientation;
    b) a means for allowing the means for directing to travel from a first position when the brake is on, to a second position when the brake is off; and
    c) a means for detecting when the means for directing is in one of the first or second positions, the means for detecting having output electronics, wherein the means for detecting includes a sensor mounted in a moveable position.

2. The railroad brake sensing apparatus according to claim 1 wherein the means for directing is one of a sheave wheel or bell crank.

3. A railroad brake sensing apparatus for a railcar having at least one brake comprising:
    a) a means for directing a brake actuation force from a first orientation to a second orientation wherein the means for directing is a sheave wheel;
    b) a means for allowing the means for directing to travel from a first position when the brake is on, to a second position when the brake is off; and
    c) a means for detecting when the means for directing is in one of the first or second positions, the means for detecting having output electronics, wherein the means for detecting is a sensor sensing the position of an axle of the sheave wheel.

4. The railroad brake sensing apparatus according to claim 3 wherein:
    the means for allowing is a slot bearing the axle.

5. A railroad brake sensing apparatus for a railcar having at least one brake comprising:
    a) a means for directing a brake actuation force from a first orientation to a second orientation wherein the means for directing is a bell crank;
    b) a means for allowing the means for directing to travel from a first position when the brake is on, to a second position when the brake is off; and
    c) a means for detecting when the means for directing is in one of the first or second positions, the means for detecting having output electronics, wherein the means for detecting is a sensor sensing the position of an axle of the bell crank.

6. The railroad brake sensing apparatus according to claim 5 wherein:
    the means for allowing is a slot bearing the axle.

7. A railroad brake sensing apparatus comprising;
    a brake;
    a brake linkage in communication with said brake, said brake linkage being configured to translate a brake actuation force when said brake is applied;
    a brake actuator in communication with said brake linkage, said brake actuator being configured to generate the brake actuation force in said brake linkage to apply said brake;
    a device, said device being configured to redirect the brake actuation force from a first orientation to a second orientation, said device being configured to undergo a movement when the brake actuation force is released;
    a sensing element configured to detect the movement of said device when the brake actuation force is released;
    output electronics, said output electronics being electrically connected to said sensing element; and
    a target, said sensing element having a sensitivity range, said target being located within the sensitivity range of said sensing element when the brake actuation force is released.

8. The railroad brake sensing apparatus according to claim 7:
    further comprising a railcar;
    said linkage comprising a chain;
    said brake actuator comprising a hand wheel;
    said sensing element having a sensitivity range; and
    said sensing element being selected from the group consisting of Hall effect elements, magneto-resistive sensors, proximity sensors, force sensors, and mechanically actuated switches.

9. The railroad brake sensing apparatus according to claim 8:
    said device being a sheave wheel;
    said sheave wheel comprising an axle;
    said axle being mounted in a slot; and
    the movement being said axle translating in said slot.

10. The railroad brake sensing apparatus according to claim 9,
    said axle being said target for said sensing element; and
    said sensing element being a magnetically sensitive sensor.

11. A railroad brake sensing apparatus comprising:
    a brake;
    a brake linkage in communication with said brake, said brake linkage being configured to translate a brake actuation force when said brake is applied;

a brake actuator in communication with said brake linkage, said brake actuator being configured to generate the brake actuation force in said brake linkage to apply said brake;

a sheave wheel, said sheave wheel being configured to redirect the brake actuation force from a first orientation to a second orientation, said sheave wheel being configured to undergo a movement when the brake actuation force is released;

a sensing element configured to detect the movement of said sheave wheel when the brake actuation force is released;

output electronics, said output electronics being electrically connected to said sensing element; and said sheave wheel comprising an axle, said axle being mounted in a slot, the movement being said axle translating in said slot.

12. The railroad brake sensing apparatus according to claim 11, said axle comprising a target for said sensing element.

13. The railroad brake sensing apparatus according to claim 11, said sensing element being mounted on said axle.

14. A system for sensing a position of a brake on a railcar, the brake being of the type having a brake linkage having a wheel or bellcrank, the wheel or bellcrank having an axle, the claimed system comprising:

a bracket having a hole configured to receive the axle, said hole being configured such that the axle undergoes translation within said hole when tension is applied to the brake linkage; and an electronic sensing element configured to be mounted near the axle to detect said translation.

15. The system according to claim 14, said hole being a slot.

16. The system according to claim 15 further comprising a sheave wheel.

17. The system according to claim 15, said sensing element being a magnetically sensitive sensor.

18. The system according to claim 14, further comprising a bellcrank.

19. The system according to claim 14, said sensing element being selected from the group consisting of Hall effect elements, magneto-resistive sensors, proximity sensors, force sensors, mechanically actuated switches and combinations thereof.

* * * * *